United States Patent
Latapy

[15] 3,683,500
[45] Aug. 15, 1972

[54] MANUFACTURE OF CHEESES TO BE SOLD BY UNIT

[72] Inventor: Jacques Latapy, 14, Rue Georges Ville, 75 Paris 16th, France

[22] Filed: Oct. 7, 1969

[21] Appl. No.: 864,362

[30] Foreign Application Priority Data

Oct. 7, 1968  France.....................68168966

[52] U.S. Cl............................................31/46, 31/49
[51] Int. Cl............................A01j 25/12, A01j 25/16
[58] Field of Search.........................31/46, 44, 89, 49

[56] References Cited

UNITED STATES PATENTS 3,192,626  7/1965  LeBoeuf.........................31/46
3,465,439  9/1969  Wakeman et al..............31/46

FOREIGN PATENTS OR APPLICATIONS 1,363,307  5/1964  France

Primary Examiner—Hugh R. Chamblee
Attorney—Hane & Baxley

[57] ABSTRACT

A machine for the industrial manufacture of cheese includes a milk-filling station, a curd-slicing station, a curd-transfer station and a washing station. Jars are circulated in a closed path sequentially through the stations so that the jars are first filled with milk which changes to curd. The curd is then sliced and transferred from the jars which are then washed.

10 Claims, 10 Drawing Figures

INVENTOR
JACQUES LATAPY
By Hane and Baxley
ATTORNEYS

INVENTOR
JACQUES LATAPY
By Hane and Baxley
ATTORNEYS

INVENTOR
JACQUES LATAPY
BY Hane and Baxley
ATTORNEYS

MANUFACTURE OF CHEESES TO BE SOLD BY UNIT

The invention concerns the manufacture of cheeses to be sold by units, more particularly camembert cheese.

It is known that, in the manufacture of cheeses to be sold by units, such as camembert cheese, it is necessary to have at disposal cheeses of a higher weight than that required, in order to allow for the dispersion in the weight of cheeses actually produced.

With the process of industrial manufacture of camembert cheese most frequently used, the weights of the cheeses which are obtained differ among themselves by as much as 10 percent, so that it is necessary, in order to comply with regulations in force and to meet commercial imperatives, to manufacture cheeses having on an average a weight distinctly higher than that required.

The object of the invention is to provide a process of industrial manufacture of cheeses intended to be sold by units, which reduces in a large degree the dispersion in the weights of the cheeses which are obtained, thus enabling one to bring down the manufacturing cost of a cheese, while complying with the fixed minimum weight condition.

It is also an object of the invention to provide a process which, independently of the dispersion reduction, improves the cheese output.

Another object of the invention is to provide an equipment for the industrial manufacture of cheeses to be sold by units which may easily be realized, and consequently be economical.

Yet another object of the invention is to provide such an equipment in which automation is carried to a high degree, thus bringing down the ultimate manufacturing cost.

A distinctive feature of the invention lies in the fact that the industrial manufacture of cheeses, more particularly of soft cheese such as camembert cheese, takes place, up to the moulding, not in pans or bowls filled with a quantity of milk corresponding to at least some ten cheeses, more often than not to several tens of cheeses, but in an autonomous vessel containing a quantity of milk corresponding to a single cheese, in which all the operations, up to the moulding, are carried out.

The process according to the invention thus consists, for the industrial manufacture of soft cheese to be sold by units, such a camembert cheese, in filling containers with a quantity of milk, with rennet added or not, corresponding, for each container, to one single cheese, and which may vary according to the seasons or to the quantity of the milk, but is constant for all the containers of one manufacturing cycle ; also on occasion in adding to the milk contained in each vessel the same quantity of rennet, moreover extremely small ; and, after the action of the fermentation at the desired temperature (s) is completed, in carrying out in the same vessels the fragmentation or slicing of the curd which is obtained, after which the contents of each vessel are transferred to a mould assigned to them, where the manufacturing process goes on.

In a variant the milk, with rennet added or not, is poured in non-communicating cells, not necessarily of strictly identical shapes or capacities.

It has been noted that cheeses so manufactured are much more uniform in weight than these obtained with industrial processes in current use, even with the processes calling on a slicing of a curd cylinder along parallel sections in order to obtain slices corresponding to the dimensions of a mould, the cheeses obtained according to the process of the invention being of a uniform and satisfactory quality.

The process according to the invention avoids altogether the drawbacks resulting from the uneven repartition of the curd in the moulds, when the curd contained in a tank or similar of large capacity is poured in the moulds, which drawbacks were hitherto impossible to remove, in spite of all the precautions which could be taken.

In particular, the invention relates to a way of execution of the process characterized by the application of a continuous method calling for processing vessels of a comparatively small capacity, such as those corresponding to the manufacture of a single cheese, thus allowing the establishing of industrial plants profiting by the advantages attached to continuous manufacture.

Indeed, it has been noted that, while it was impossible to preserve the medium contained in a tank, as hitherto usual, from the vibrations and jolts, even though they are imperceptible, resulting from the displacements implied by continuous manufacture, which lead to cheeses of an irregular, sometimes moreover inacceptable, quality, surprisingly such displacements do not, in the case of vessels such as those required for the manufacture of a single cheese, with a comparatively large height with respect to their diameter and a comparatively small capacity (about 2 liters), entail any variation in the quantity of the end product. It must be that the increase of the surface of contact between the liquid contained in the vessel or jar and the latter's inner surface practically cancels, within the liquid, the effects of small jolts which the vessels may undergo during a continuous manufacture.

According to another distinctive feature of the invention, of an advantageous, but not compulsory, application, the cutting up of the curd or fragmentation in order to remove a certain quantity of serum through exudation, is effected with blades. It has been noted that the forming of curd fragments, which occurs when the cutting up is carried out with wires, as hitherto usual, is thus avoided. The application of a cutting up with wires involves an economy of the order of several percents, up to 5 percent, on the quantity of milk needed to manufacture one cheese, which economy adds itself to that resulting from the considerable reduction in the mean variation between cheeses of a manufacturing batch.

The invention also relates to the equipment for implementing this process, and to the appliances belonging to this equipment, in particular that for the cutting up of the curd, along with an apparatus for the transfer of the curd from a multiplicity of containers to a multiplicity of moulds.

It also relates to the cheeses thus obtained which, although being industrially manufactured, nevertheless have the qualities hitherto assigned to cheeses produced on a small scale.

In the following description, which is exemplary one refers to the appended drawing, in which.

Figure 1:
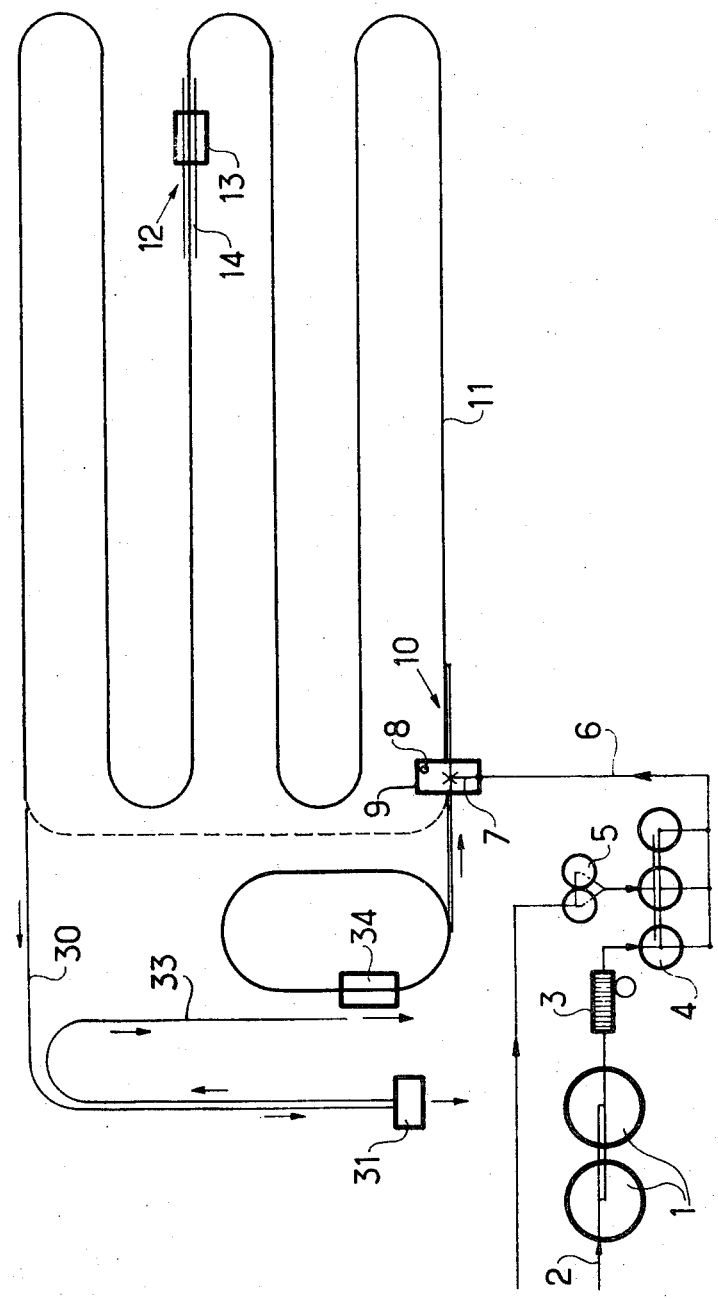
FIG. 1 is a very diagrammatic view of an equipment according to the invention.
Figure 2:
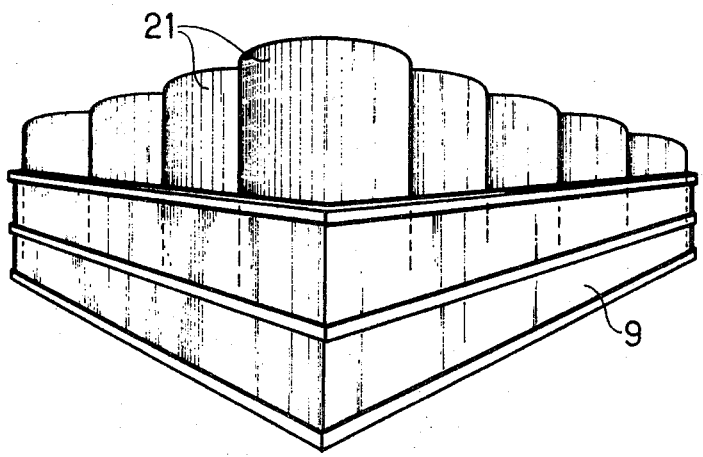
FIG. 2 is a perspective view of a jar-rack.

An equipment according to the invention for the manufacture of camembert cheese includes, in the mode of realization shown in FIG. 1, standardized tanks 1 for the storage of milk supplied by pipes 2, from which the milk is conveyed to a gas-removing sterilizing apparatus 3. After going through this apparatus, the milk is conveyed to mixing-tanks or containers 4, also supplied in a fixed proportion with leavens coming from tanks 5. The milk with an admixture of rennet passes through pipe 6 to filling apparatus 7 which hangs over a group of small containers or jars, for instance 20 in number, set in a rack 9 along four rows of five jars each (FIG. 2). Each jar is of a general cylindrical shape, with a height advantageously larger than the diameter, the upper aperture being open. The capacity of each jar is of the order of 2.5 liters. The apparatus 7 performs the filling of each jar with the suitable quantity of milk with an admixture of rennet, usually included between 1.8 and 2.2 liters.

The filling-station 10, which included the apparatus 7, is at the start of a track 11, sinuous in shape, on which the racks containing the groups of jars of milk with an admixture of rennet are circulated up to a slicing-station 12. The circulation is advantageously continuous. It may also be made up of alternating moving and stopping phases.

The circulation speed is adjusted so that the contents of the jars, when the latter reach station 12, are in a condition appropriate to undergo the slicing operation. Moreover it has been noted that, contrary to current opinion, the moment of the slicing is not critical, thus allowing the slicing apparatus 13 to be fixed with respect to the track 11, notwithstanding the usual fluctuations of the factors which affect the curd-forming. Nevertheless one has diagrammatized means 14 allowing, if so wished, a shifting of the slicing apparatus 13 with respect to the track 11.

Figure 3:
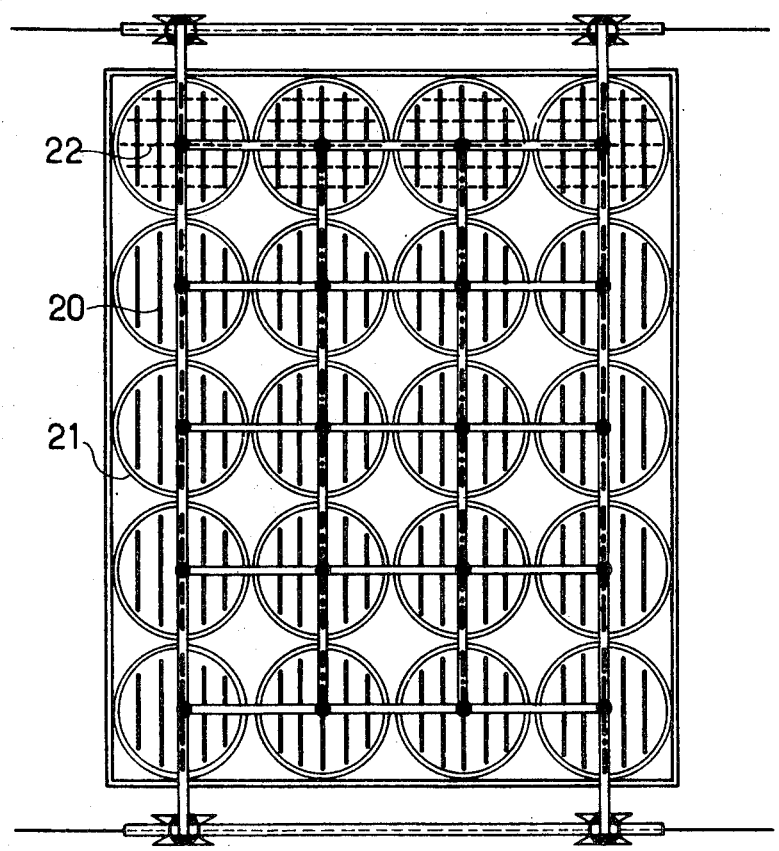
FIG. 3 is a view of part of a curd-slicing apparatus.

According to the invention, the slicing means are made up of blades, instead of wires as hitherto usual. There is shown FIG. FIG. 3 part of a slicing apparatus made up of multiplicities of sets of parallel blades 20, each multiplicity hanging over a jar 21. For instance, five parallel blades are provided for each multiplicity. There is also shown by the dotted lines 22 the slicing performed by a group of multiplicities of similar blades making up the first part of the apparatus which enter the jars, before the part shown in FIG. 3, the blades of that group being perpendicular to the blades 20.

It has been noted that this slicing in two steps, in each of which the curd is cut up, not along sections transverse to one another, but along parallel sections, finally leads to the minimum fragmentation of the curd.

Figure 4:
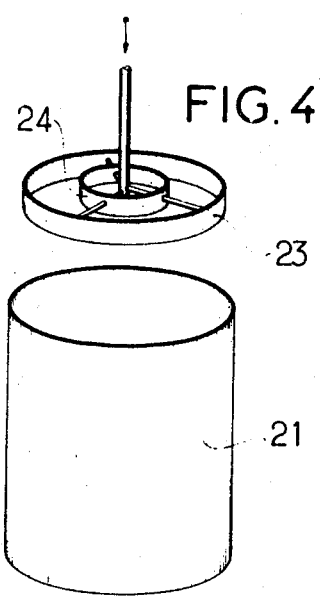
FIG. 4 is a perspective view of a slicing appliance, for a variant.

In another mode of realization, the slicing is, for each jar, performed by several, for instance two, concentric circular blades 23, 24, as shown in FIG. 4. With such an apparatus, the slicing may be carried out in a single step.

This appliance may also be combined with an apparatus with radial blades cooperating in a second step.

Figure 5:
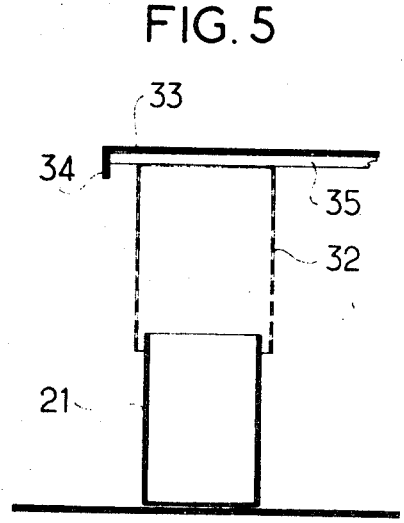
FIG. 5 is a view of part of a mould-filling apparatus.

The circulation of the jars containing the sliced curd and the serum goes on along track 11, after the slicing station 12, and the jars reach, through branch 30 of track 11, a transfer or turning-over station 31. At the turning-over station, the jars 21 contained in a rack are capped by corresponding moulds 32 (FIG. 5), constituted by perforated cylinders or tubes, these cylinders being topped by a metallic plate 33 with edge 34, with an usual blind in wood slats interposed. The rack containing the jars thus capped is, as a whole, turned opposite down, so that the contents of each jar 21 go into the corresponding mould 32. The serum drains away through the open bottom of mould 32 in the intervals between the wood slats, and through the perforated cylindrical tube; at the exit of branch 33, the moulds filled with curd are conveyed to the draining and the stations where the further operations resulting in cheeses take place.

The jars 21, freed from their contents during the turning-over are, at the end of track 33, transferred to a washing apparatus 34 and brought back to the filling station 10.

Figure 6:
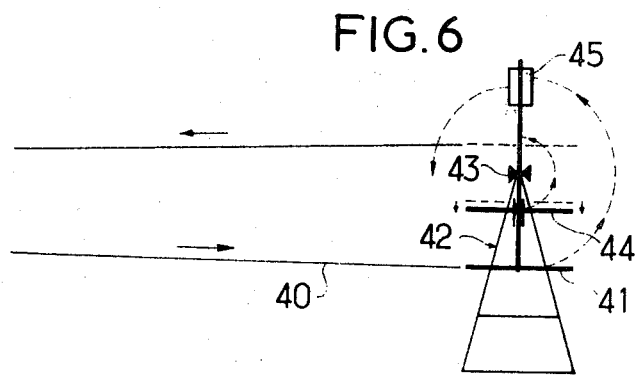
FIG. 6 is a view of an apparatus designed to carry out the mould-filling.
Figure 7:
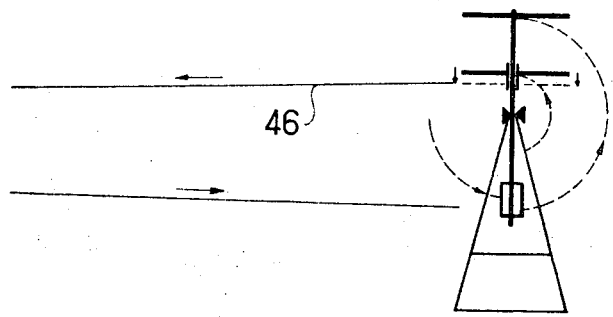
FIG. 7 is a view similar to FIG. 6, for other conditions.

FIGS 6 and 7 relate to a turning-over apparatus. The racks 9 with the jars 21 capped by the moulds 32 and by the plate 33 with blind reach, through track 40, the lower platform 41 of a swing 42 rotating about the axis 43, the swing including an upper platform 44 topping the plate 33. The swing 42 carrying the rack 9 is rotated around the axis 43 by an angle of 180°, the rotation being made easier by a counterweight 45, and the rack thus turned over (FIG. 7) is delivered on track 46, on which it lies through the plate 33, and which carries it towards the draining.

Figure 8:
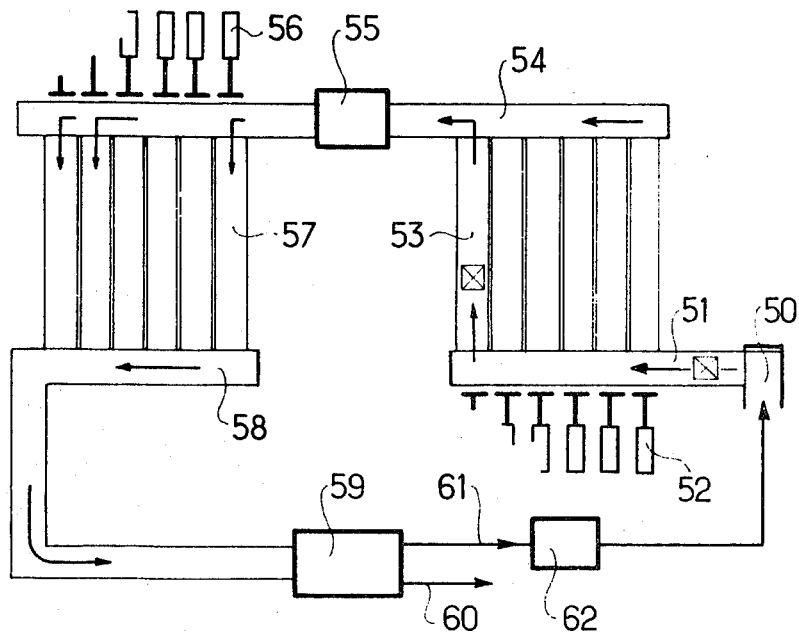
FIG. 8 is a diagrammatic view of an equipment according to the invention, for a variant.

FIG. 8 relates to a variant of an equipment according to the invention. In this variant, the filling station 50, which includes an appliance to proportion the rennet in the milk, or an appliance to proportion the milk and an appliance to proportion the rennet, is located at the origin of a track 51, on which the jar-racks progress is a discontinuous manner, the moving phases being separated by stopping phases. One may thus, with the help of jacks 52, or push-rods, provide stationary tracks 53 with jar-racks. The racks are removed by a moving track 54 with a discontinuous motion similar to that of track 51, and on the course of which is located the slicing station 55. After this station, jacks or push-rods 56 provide stationary tracks 57, transverse to tracks 54 and 51 and parallel to tracks 53, with racks taken from track 54. At the end of tracks 57, a moving track 58 carries the jar-racks containing the sliced curd towards a turning-over station 59, from which the moulds are conveyed by a track 61 towards a washing apparatus 62. The washed jars are put back in the circuit at the filling station 50.

Figure 9:
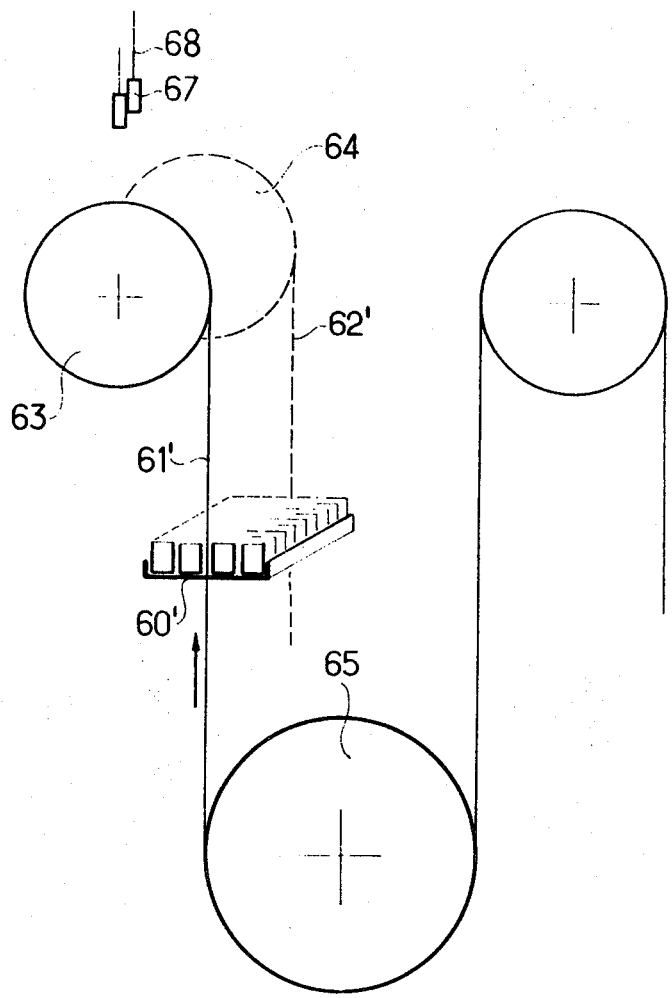
FIG. 9 is a diagrammatic view of an equipment according to the invention, for another mode of realization.

Let us now refer to FIG. 9, which is very diagrammatic and relates to another mode of realization of an equipment according to the invention, in which the circulation of jars or cylinders follows a vertical instead of an horizontal course. The equipment includes forms 60' fit to contain for instance two groups of twenty jars, which hang by their extremities to chains 61' and 62' passing on couples of wheels or pulleys 63, 64, and 65, etc., with horizontal and parallel axes, arranged along an upper and a lower level, thus defining for the forms successively ascending and descending courses, etc. An equipment of this type can be set up in rather small premises.

For this equipment, the invention provides for a slicing apparatus made up of multiplicities of parallel blades 67, circular or straight, carried by vertical rods 68 subject as a whole to an horizontal motion of speed equal to the circulation speed of the forms. By setting up such an apparatus to hang over a couple of pulleys 63, 64, a slicing is carried out through falling and a rising of the rods 68 without interrupting the circulating motion of the forms.

The invention provides for such an equipment in which the motion of the forms is discontinuous ; the slicing is then carried out through a purely vertical motion of the blades.

Figure 10:
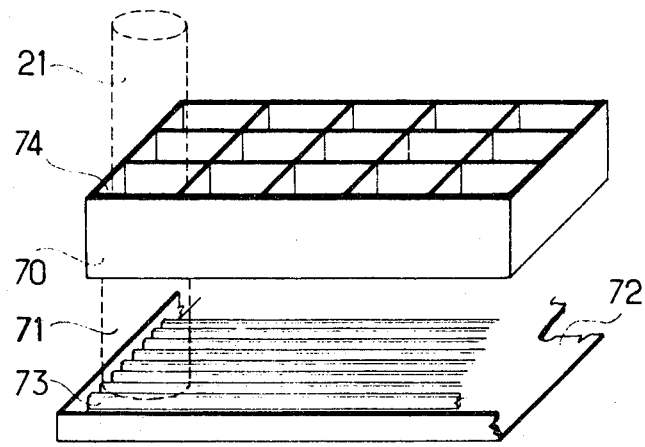
FIG. 10 is a view of an apparatus to partition the mould, for a variant.

According to another realization, the jars are capped with a device made up, first of a framework 70 (FIG. 10), the cells of which correspond in arrangement to those of the jars in a rack ; the framework is topped with moulds of perforated iron, of a comparatively small height, themselves topped with a plate 72, with the usual blind 73 interposed.

After the turning-over (as shown in the FIG.), the contents of each jar 21, that is the curd and the serum, are decanted into the mould 71 and the intermediate cell 74 of the compartment. The serum flows out through the bottom of the mould, and through the perforated iron which makes up the lateral wall of the mould, so that the curd is placed in a mould of a capacity appreciably smaller than that of the jar. The cellular framework 70 is then separated from the moulds.

I claim

1. A machine for making a soft cheese comprising a plurality of racks for carrying containers, a plurality of containers in each rack, each of said containers being cylindrical and having a height which is greater than its diameter, the capacity of each container corresponding to the quantity of rennet treated milk necessary to make a single final cheese, means for guiding said racks along a path with horizontal branches, means at the start of said path to fill each of said containers with a quantity of milk sufficient to make a single final cheese, means along said path for slicing curds formed from the rennet treated milk, means operable for transferring the contents of each of the containers into a corresponding mould, draining means associated with said moulds for removing the serum formed from the cheeses therein, and means for guiding the empty containers to the start of the path.

2. A machine according to claim 1 wherein the length of the path between said curd-slicing means and said transferring means is the same order of magnitude as the length of the path between the start of the path and said curd-slicing means.

3. Apparatus according to claim 1 wherein said curd-slicing means includes rectilinear slicing blades and means for reciprocatingly moving said blades in a direction perpendicular to their edges.

4. A machine according to claim 3, characterized by the fact that the blades are grouped in multiplicities of parallel blades.

5. A machine according to claim 4, characterized by the fact that a multiplicity corresponds to the slicing of the curd contained in one container.

6. A machine according to claim 4, characterized by the fact that the slicing station includes as many multiplicities of blades as there are containeers in a rack.

7. A machine according to claim 6, characterized by the fact that curd-slicing is made up of two parts which differ among themselves by the direction of the parallel blades.

8. A machine according to claim 3, characterized by the fact that the blades are circular.

9. A machine according to claim 3, characterized by the fact that the blades are radial.

10. A machine according to claim 1 characterized by the fact that said draining means includes a holder for a multiplicity of moulds, with discontinuities to let serum drain away.

* * * * *